(12) United States Patent
Marone et al.

(10) Patent No.: US 9,462,928 B2
(45) Date of Patent: Oct. 11, 2016

(54) ELECTRICALLY-CONTROLLED ACTUATOR DEVICE, AND WASHING AGENTS DISPENSING DEVICE COMPRISING SUCH AN ACTUATOR DEVICE

(71) Applicant: BITRON POLAND SP.Z O.O., Sosnowiec (PL)

(72) Inventors: Giuseppe Marone, Turin (IT); Sergio Damilano, Cuneo (IT)

(73) Assignee: BITRON POLAND SP .Z O.O., Sosnowiec (PL)

( * ) Notice: Subject to any disclaimer, the term of this patent is extended or adjusted under 35 U.S.C. 154(b) by 213 days.

(21) Appl. No.: 14/362,431

(22) PCT Filed: Dec. 20, 2012

(86) PCT No.: PCT/EP2012/076303
§ 371 (c)(1),
(2) Date: Jun. 3, 2014

(87) PCT Pub. No.: WO2013/092813
PCT Pub. Date: Jun. 27, 2013

(65) Prior Publication Data
US 2014/0339265 A1 Nov. 20, 2014

(30) Foreign Application Priority Data
Dec. 20, 2011 (PL) .......................................... 397476

(51) Int. Cl.
*H01H 61/01* (2006.01)
*A47L 15/44* (2006.01)
(Continued)

(52) U.S. Cl.
CPC ........ *A47L 15/4463* (2013.01); *A47L 15/4409* (2013.01); *F03G 7/065* (2013.01); *H01H 37/323* (2013.01); *H01H 61/0107* (2013.01); *H01H 71/145* (2013.01); *H01H 2300/034* (2013.01)

(58) Field of Classification Search
CPC ........... A47L 15/4409; A47L 15/4463; F03G 7/065; H01H 61/0107
USPC .......................... 337/123, 139, 140, 382, 395
See application file for complete search history.

(56) References Cited

U.S. PATENT DOCUMENTS 3,634,803 A * 1/1972 Willson ............. H01H 61/0107
                                                337/123
3,968,380 A * 7/1976 Jost .......................... H01R 4/01
                                                307/99

(Continued)

FOREIGN PATENT DOCUMENTS

DE   195 45 773 A1   6/1996
DE   197 56 679 A1   7/1999

(Continued)

OTHER PUBLICATIONS

International Search Report of PCT/EP2012/076303 dated Jul. 22, 2013.

(Continued)

Primary Examiner — Anatoly Vortman
(74) Attorney, Agent, or Firm — Sughrue Mion, PLLC

(57) ABSTRACT

An actuator device which includes a stationary support structure, a movable member displaceable relative to the structure, and a wire of a shape-memory material, which extends in the structure between two anchoring elements and the movable member such that the wire shortens when an electric current flows therethrough, causing a displacement of the movable member against the action of a counteracting member. In the structure there are provided two deflection members disposed along the path of the shape-memory wire, each one between the movable member and the corresponding anchoring element of the wire, such as to cause a deflection of the wire between each anchoring element and the movable member.

8 Claims, 3 Drawing Sheets

(51) Int. Cl.
*H01H 37/32* (2006.01)
*H01H 71/14* (2006.01)
*F03G 7/06* (2006.01)

(56) References Cited

U.S. PATENT DOCUMENTS

| | | | | |
|---|---|---|---|---|
| 4,544,988 | A | * | 10/1985 | Hochstein .......... H01H 61/0107 337/140 |
| 4,700,541 | A | * | 10/1987 | Gabriel ................ B25J 9/1085 148/402 |
| 4,887,430 | A | * | 12/1989 | Kroll .................... F03G 7/065 337/140 |
| 5,410,290 | A | * | 4/1995 | Cho .................. H01H 61/0107 337/140 |
| 5,684,448 | A | * | 11/1997 | Jacobsen ............ H01H 61/0107 337/123 |
| 6,016,096 | A | * | 1/2000 | Barnes ............... H01H 61/0107 337/12 |
| 6,494,225 | B1 | | 12/2002 | Olewicz et al. |
| 7,270,135 | B2 | | 9/2007 | Virgilio et al. |
| 7,372,355 | B2 | * | 5/2008 | Agronin ................ H01H 3/227 337/123 |
| 8,051,656 | B1 | | 11/2011 | Cripe et al. |
| 2003/0156006 | A1 | | 8/2003 | Hanke et al. |
| 2007/0119677 | A1 | | 5/2007 | Barnum et al. |
| 2008/0271559 | A1 | | 11/2008 | Garscha et al. |
| 2009/0133398 | A1 | * | 5/2009 | Hamaguchi ............. F03G 7/065 60/527 |
| 2009/0235963 | A1 | | 9/2009 | Classen et al. |
| 2014/0103232 | A1 | * | 4/2014 | Deperraz ................ F16K 11/10 251/11 |

FOREIGN PATENT DOCUMENTS

| | | |
|---|---|---|
| DE | 10 2006 043 919 A1 | 3/2008 |
| EP | 1 626 177 A1 | 2/2006 |
| EP | 1 752 661 A1 | 2/2007 |
| WO | 01/99135 A1 | 12/2001 |

OTHER PUBLICATIONS

Written Opinion of the International Searching Authority of PCT/EP2012/076303 dated Jul. 22, 2013.
International Preliminary Report on Patentability of PCT/EP2012/076303 dated Dec. 19, 2013.

* cited by examiner

ELECTRICALLY-CONTROLLED ACTUATOR DEVICE, AND WASHING AGENTS DISPENSING DEVICE COMPRISING SUCH AN ACTUATOR DEVICE

CROSS REFERENCE TO RELATED APPLICATIONS

This is a National Stage of International Application No. PCT/EP2012/076303 filed Dec. 20, 2012, claiming priority based on Polish Patent Application No. 397476 filed Dec. 20, 2011, the contents of all of which are incorporated herein by reference in their entirety.

BACKGROUND OF THE INVENTION

1. Field of the Invention

The present invention relates generally to electrically-controlled actuator devices, in particular for use in electric household appliances.

2. Background

U.S. Pat. No. 6,494,225 B1 discloses an electrically-controlled actuator of the kind for use in a proportional flow control valve, wherein a shape-memory wire extends between two ring connectors fixed to a support structure by means of screws or the like and connected to an electric connector block by conductive leads or wires.

U.S. Pat. No. 8,051,656 B1 discloses another electrically-controlled actuator device comprising a wire of a shape-memory material.

DE 10 2006 043 919 A1 discloses a dispenser for dispensing different washing agents in a washing machine, comprising a shape-memory-alloy element.

Electrically operable actuator devices comprising a wire made of a shape-memory material are also disclosed in U.S. Pat. No. 7,270,135 B2.

In said prior document, with particular reference to FIGS. 3 and 4 thereof, there are disclosed actuator devices wherein the shape-memory wire extends between two anchoring elements and the movable member, such that it follows an essentially V-shaped path.

Such actuator devices allow, however, to cause only limited displacements of the associated movable member. The magnitude of such displacements is, in fact, dependent on the length of the available shape-memory wire.

An object of the present invention is to provide an improved actuator device of the above-specified kind.

SUMMARY OF THE INVENTION

This and other objects are achieved according to the present invention by an electrically-controlled actuator device having the features described herein.

The invention is also directed to a washing agents dispensing or distributing device, or the like, particularly for a dishwashing machine, comprising an electrically-controlled actuator device as specified above.

BRIEF DESCRIPTION OF THE DRAWINGS

Further characteristics and advantages of the invention will become apparent from the following detailed description, provided merely by way of a non-limiting example, with reference to the accompanying drawings, wherein.

DETAILED DESCRIPTION OF THE INVENTION

Figure 1:
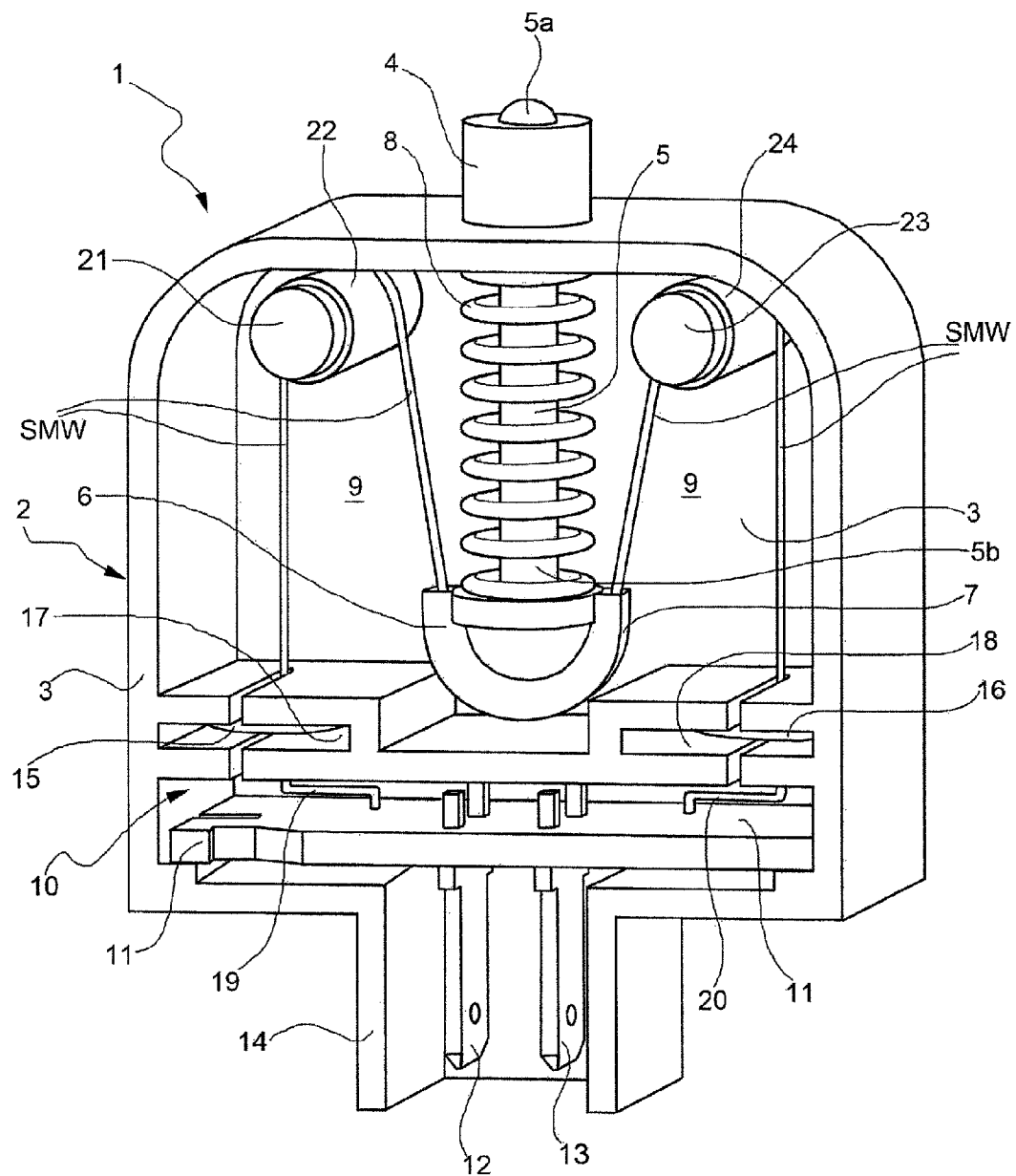
FIG. 1 is a perspective view of an electrically-controlled actuator device according to the present invention.

With reference to FIG. 1, an electrically controlled actuator device 1 according to the present invention comprises a support structure 2 which is stationary in the operation, and which is made, for instance, of an electrically insulating material, such as a moulded plastic material.

In the illustrated embodiment, the support structure 2 comprises an envelope 3, shaped essentially as a box or a tub, possibly provided with a closing cover which is not illustrated in the drawings.

In the illustrated embodiment, at one end the envelope 3 has an external tubular formation 4, wherein a passage is defined through which an axially translatable rod 5 extends.

The rod 5 extends mainly inside the envelope 3, and protrudes outside with its end indicated 5a in FIG. 1.

The other end 5b of the rod 5, which extends inside the envelope 3, carries an essentially semi-circular deflecting formation 6, provided with a peripheral groove 7, which is correspondingly semi-circular.

Inside the envelope 3 a helical spring 8 is disposed around the rod 5, and tends to urge the latter to a condition retracted in the envelope 3.

The internal region of the envelope 3 is divided into a main chamber 9, in which the rod 5 extends, and an adjacent chamber 10 in which a printed-circuit board 11 is fixed.

The plate 11 carries two connection members 12 and 13, made of an electrically-conducting material, which in the illustrated embodiment are in the shape of male plug blades.

The connection members 12 and 13 extend themselves inside a formation 14 provided in one piece with the envelope 3, on the side opposite the tubular formation 4.

The formation 14 is at least partially open toward the outside, to allow the connection members 12 and 13 to be coupled with an external control circuit (not shown).

Figure 2:
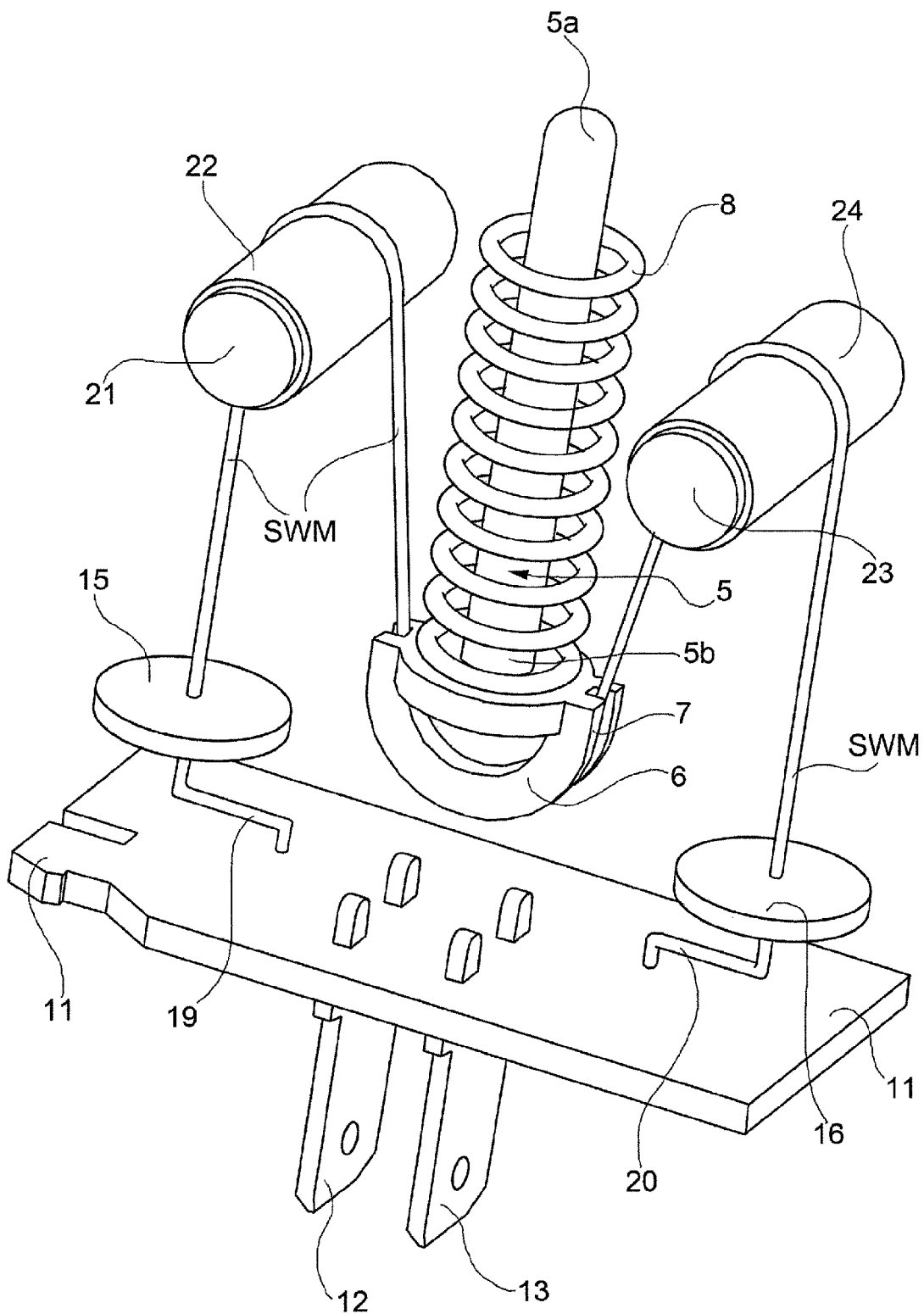
FIG. 2 shows the device of FIG. 1, without the support structure thereof.

By SMW in the drawings there is indicated a shape-memory wire which, inside the envelope 3, has its ends soldered (or otherwise connected) to the plate 11 (see in particular FIG. 2).

In the embodiment shown in the drawings, close to the ends of the wire SMW there are fastened respective anchoring elements 15 and 16, for instance shaped like disks, which are engaged and retained in respective receptacles 17 and 18 predisposed in the envelope 3, above the chamber 10.

With reference to FIG. 1, the upper and lower walls of the receptacles 17 and 18 have respective slots to allow the passage of the portions of the wire SMW which extend from both sides of the corresponding anchoring elements 15 and 16.

The portions 19, 20 of the wire SMW comprised between the anchoring elements 15, 16 and the plate 11 are relatively loose.

Thanks to the above-described solution, in the operation a shortening of the wire SMW, due to the passage of an electric current therethrough, does not stress the soldering points of the ends of said wire to the plate 11.

Starting from the anchoring element 15, the shape-memory wire SMW extends (upwardly for the observer of FIGS. 1 and 2) in chamber 9 of the envelope 3 up to a first deflection member 21 placed at a higher level with respect to the lower end of the rod 5.

The deflection member 21 conveniently includes a pin which is solid with the envelope 3, and a bush 22, for instance made of metal, which is rotatably disposed thereabout.

The wire SMW is deflected around the bush 22, downwardly toward the end formation 6 of the rod 5.

The wire SMW then slidably engages in the semi-circular groove 7 of said formation 6, and emerges therefrom extending (still upwardly for the observer of FIGS. 1 and 2) toward a second deflection member 23, likewise provided in the chamber 9 of the envelope 3, at a level higher than the lower end 5b of the rod 5, on the side opposite the deflection member 21 with respect to the rod 5.

Also, member 23 can conveniently include a pin solid with the envelope 3, on which a bush 24, for instance made of metal, is rotatably mounted.

The shape-memory wire SMW passes around the bush 24, and extends thereafter downwardly to the anchoring element 16, and then up to the printed-circuit board or plate 11.

At the board or plate 11 the ends of the memory-shape wire SMW are connected to the connection members 12 and 13, possibly through a resistor having a positive temperature coefficient (PTC resistor), intended to limit, in operation, the current flowing through said wire SMW.

Due to the presence of the deflection members 21, 22 and 23, 24 between the lower end 5b, 6 of the movable rod 5 and the anchoring elements 15 and 16, the shape-memory wire SMW undergoes two deflections, forming conspicuous bends at said deflection members.

As a whole, between the anchoring elements 15 and 16 the shape-memory wire SMW follows a path which is shaped essentially like an M.

By virtue of the plurality of deflections of the path of the wire SMW, the useful length of said wire is quite remarkable, and allows to cause displacements of the rod 5 having a large magnitude, though the overall dimensions of the actuator device 1 remain small.

When an electric current passes through the wire SMW, the latter undergoes an axial shortening.

Since the anchoring elements 15 and 16 are fixed, the shortening of the wire SMW causes the upper end 5b of the rod 5 to protrude upwardly, passing thus from a retracted condition to a (relatively more) extracted condition, in which it remarkably protrudes outside the envelope 3, through the tubular formation 4 of the latter.

When the passage of current in the wire SMW is turned off, said wire cools down and expands, allowing the rod 5 to return to its retracted condition under the action of the counteracting spring 8.

The presence of the bushes 22 and 24 on the deflection pins 21 and 23 allows to avoid that the wire SMW wears said deflection pins.

The actuator which has been described above with reference to FIGS. 1 and 2, as in general all actuators using shape-memory wires, has a reliable operation, with repeatable features for an extremely high number of activations or operating cycles.

Figure 3:
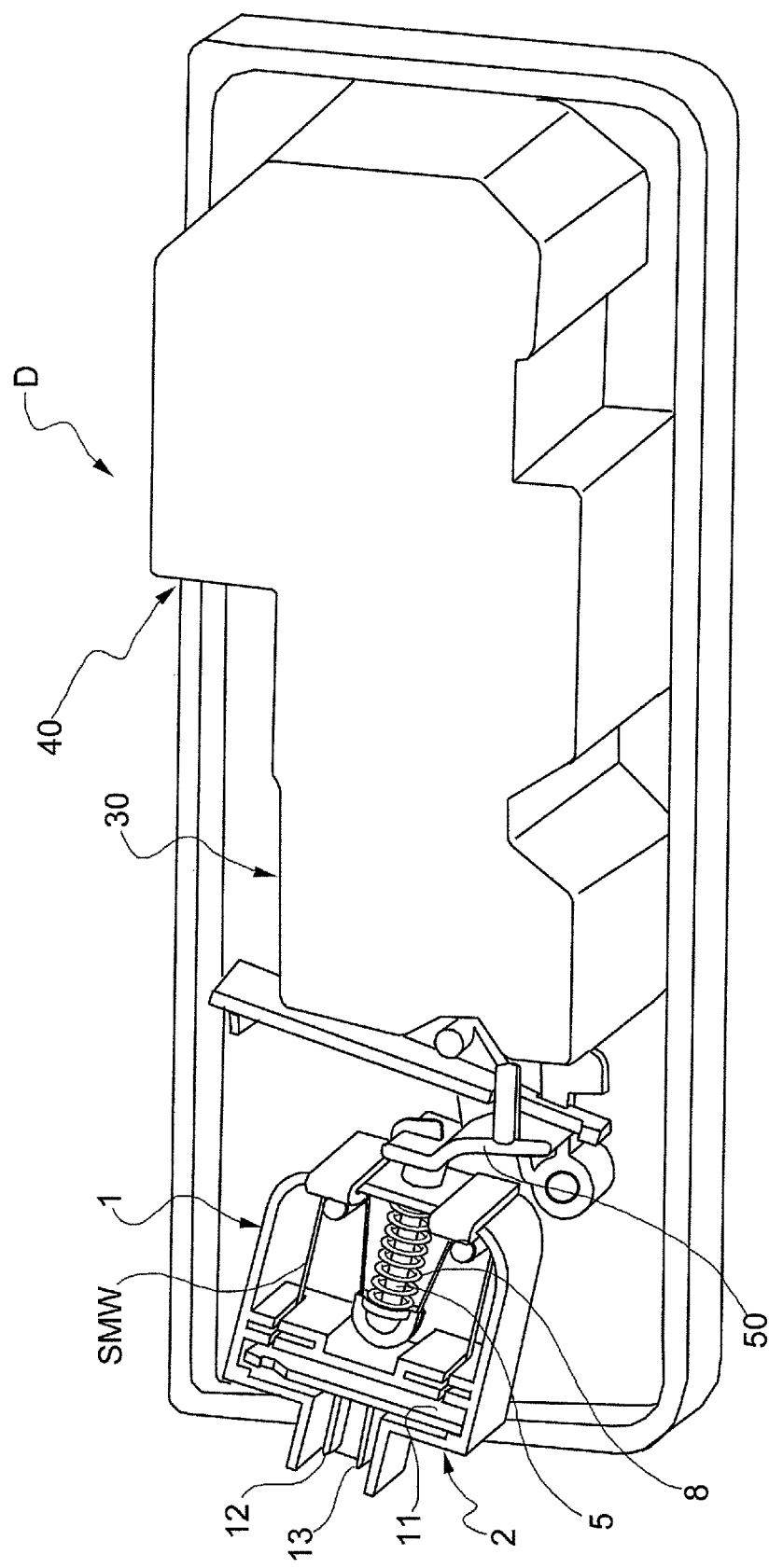
FIG. 3 is a rear perspective view of a washing agents dispensing device, for a dishwashing machine, comprising an electrically-controlled actuator device according to FIGS. 1 and 2.

In FIG. 3, at D is indicated as a whole a washing agents dispensing device, of a per se known kind, particularly for a dishwashing machine.

The device D essentially comprises two dispensing sections 30 and 40, for dispensing a washing agent like a powder detergent, and a liquid rinsing agent, respectfully.

Dispensing devices of that kind are disclosed for instance in patent applications DE 19 756 679 and DE 19 545 773.

The dispensing device D is of the (per se known) kind wherein the two dispensing sections 30 and 40 can be selectively activated in sequence, through subsequent activations of a same control member 50, activations which are conveniently caused through an electrically operable actuator device 1 of the kind described above, incorporated in the dispensing device D.

In the application illustrated in FIG. 3, the actuator device 1 according to the invention conveniently replaces a traditional electric solenoid actuator, being much simpler, less expensive and more reliable than that.

Naturally, the principle of the invention remaining the same, the embodiments and the details of construction may be widely varied with respect to what has been described and illustrated by way of non-limiting example, without departing from the scope of the invention as defined in the annexed claims.

The invention claimed is:

1. An electrically controllable actuator device comprising:
a support structure which is stationary in operation,
a movable member displaceable relative to said support structure, and
a wire (SMW) made of a shape-memory wire, which extends in said support structure between the movable member and electric connection members carried by said support structure, such that said wire (SMW) shortens when an electric current flows therethrough, causing a displacement of the movable member against the action of counteracting means,
wherein respective anchoring elements are fastened to end portions of the shape-memory wire (SMW) and retained in the support structure,
wherein said structure includes two deflection members disposed along the path of the shape-memory wire (SMW), each one between the movable member and a corresponding anchoring element of the wire (SMW), such as to cause a deflection of said wire (SMW) between each anchoring element and the movable member, so that the shape-memory wire (SMW) follows an essentially M-shaped path,
wherein said electric connection members are carried by a circuit board, which is disposed in said support structure and to which the ends of the shape-memory wire (SMW) are connected
wherein said anchoring elements are disk-shaped, inserted into respective retaining seats predisposed in said support structure, and
wherein end portions of said shape-memory wire (SMW) respectively disposed between said anchoring elements and the circuit board remain loose so that there is no stress from the shape-memory wire applied to the ends of the shape-memory wire connected to the circuit board.

2. The actuator device according to claim 1, wherein said anchoring elements and the associated deflection members are placed on opposite sides with respect to the movable member.

3. The actuator device according to claim 1, wherein a shortening of the shape-memory wire (SMW) causes a displacement of the movable member relative to said structure between a retracted position and an extracted position, against the action of said counteracting means and the movable member.

4. The actuator device according to claim 1, wherein said counteracting means comprise a resilient member associated with the movable member.

5. The actuator device according to claim 1, wherein said support structure comprises an envelope which is box-shaped, and the movable member comprises a rod movable through a corresponding opening of said envelope.

6. The actuator device according to claim 5, wherein said connection members are accessible from outside said structure at a side opposite the side through which the movable member is displaceable between a retracted condition and an extracted condition.

7. The actuator device according to claim 1, wherein said deflection members comprise respective stationary pins, solid with the support structure, on which there are rotatably mounted respective bushes, around which the shape-memory wire (SMW) is passed.

8. A dispensing device (D), for a dishwashing machine, comprising first and second dispensing means adapted to be selectively activated in sequence, for dispensing a quantity of a first and thereafter a second washing agent, as a consequence of subsequent activations of a same control member by means of an electrically-controlled actuator according to claim 1.

* * * * *